Dec. 5, 1933.  R. R. CHAPPELL ET AL  1,937,630
MEANS FOR INDICATING ANGULAR MOTION
Filed March 25, 1931    3 Sheets-Sheet 1
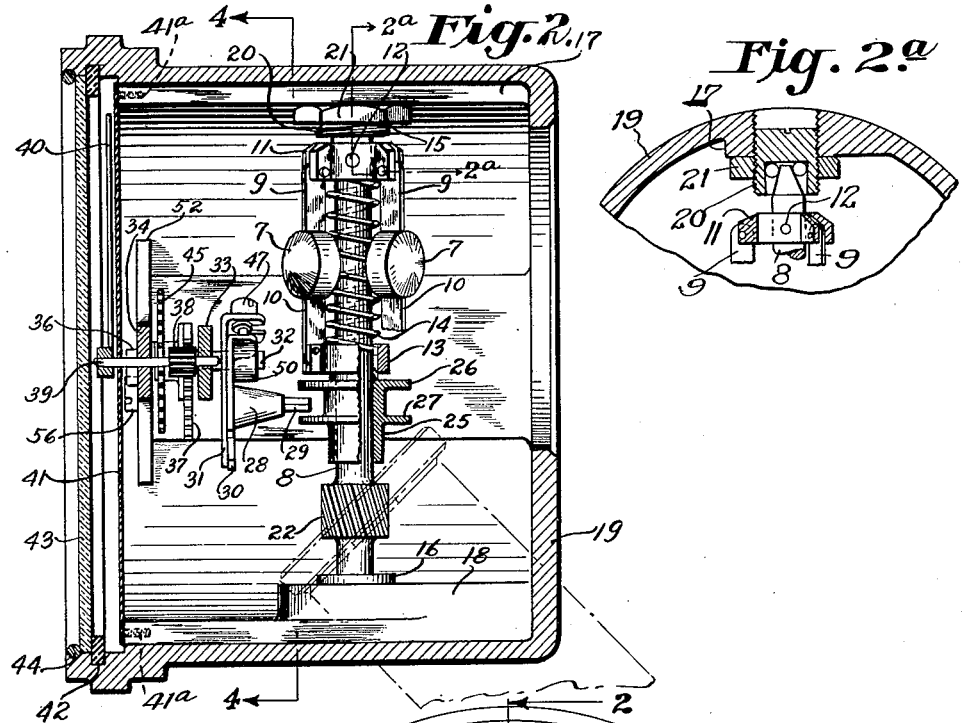
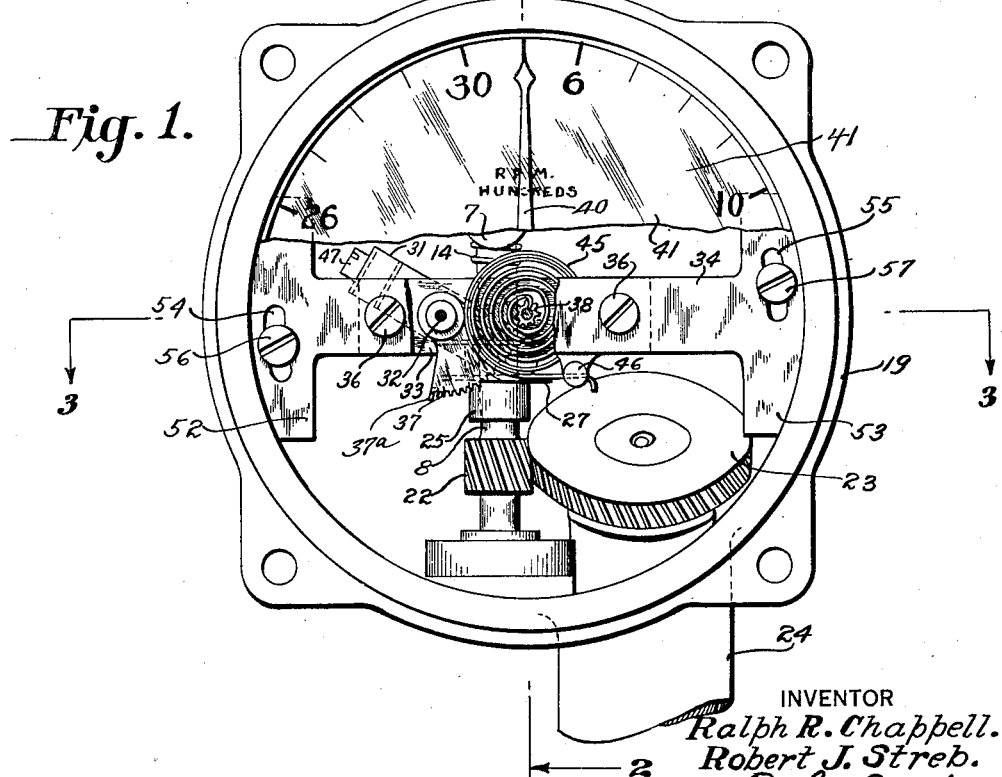
INVENTOR
Ralph R. Chappell.
Robert J. Streb.
F. B. Smith
ATTORNEY Dec. 5, 1933.  R. R. CHAPPELL ET AL  1,937,630
MEANS FOR INDICATING ANGULAR MOTION
Filed March 25, 1931   3 Sheets—Sheet 2

INVENTOR
Ralph R. Chappell.
Robert J. Streb.
BY F. B. Smith
ATTORNEY

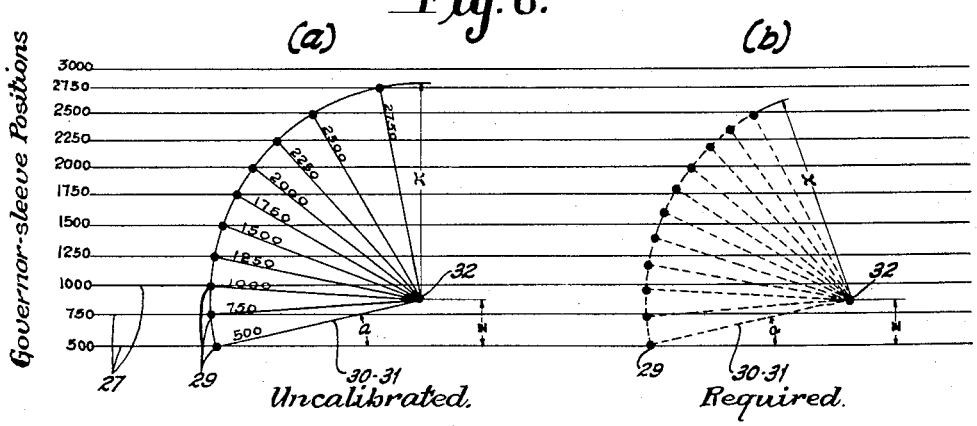
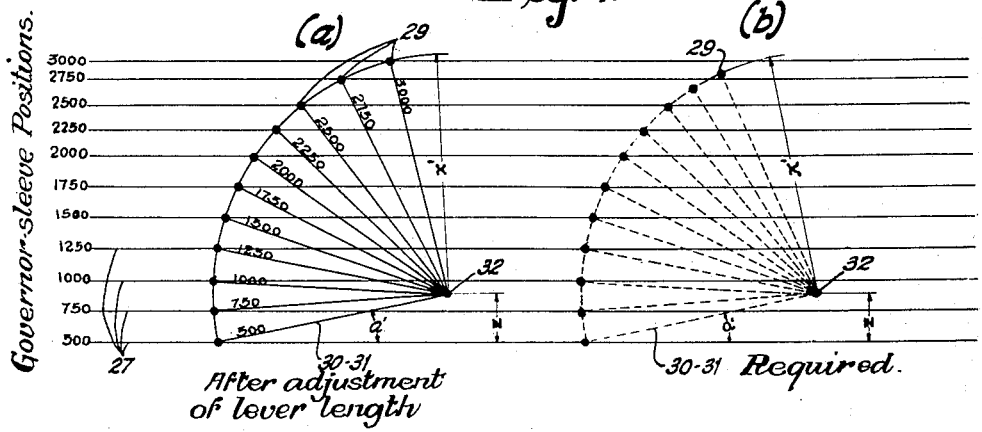
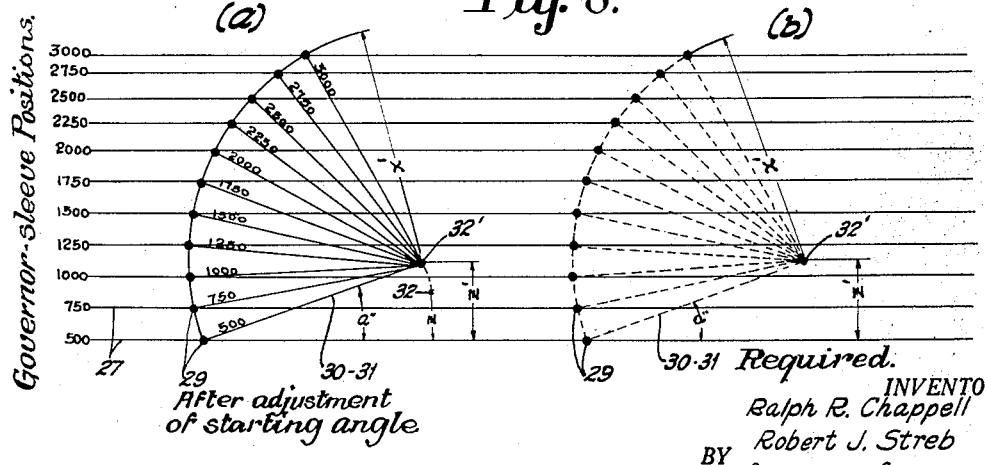

Patented Dec. 5, 1933

1,937,630

UNITED STATES PATENT OFFICE 1,937,630

MEANS FOR INDICATING ANGULAR MOTION

Ralph R. Chappell, Richmond, Va., and Robert J. Streb, Baltimore, Md., assignors to Julien P. Friez & Sons, Inc., Baltimore, Md., a corporation of Maryland Application March 25, 1931. Serial No. 525,246

7 Claims. (Cl. 264—3)

The present invention relates to means for indicating angular motion, and more particularly to instruments embodying centrifugally actuated mechanism for indicating the speed of rotating elements such as, for example, the power shafts of engines or motors.

In the manufacture of instruments of the above type, it has been a practice heretofore, after the assembly of each instrument, to place a blank dial thereon and calibrate the dial to the instrument by bringing the latter up to various speeds as indicated by a standard instrument, and then scratching the speed indicating marks on the dial for the various positions of the pointer. This procedure necessitated the making of a specially marked dial for each instrument which could not be employed with another instrument of the same type, i. e., the dials were not interchangeable. Also, after the dial had been calibrated and marked for a particular instrument, if the latter were subjected to severe shocks, the indications of the instrument would become inaccurate and another dial would have to be calibrated thereto. It is readily apparent that the making of separate dials for each instrument is, therefore, expensive since a great deal of time is required to properly calibrate and mark each dial, and after the dial is marked and finished, it can be employed only with the single instrument to which it has been calibrated. By the present invention, there is provided a novel speed indicating device which may be employed with a dial having equally or substantially equally spaced graduations already marked thereon, and which may be readily calibrated to the dial so that the position of the pointer will substantially coincide with each graduation on the dial at the indicated speed. The dials may be made all alike and manufactured in large quantities, thereby reducing the cost thereof, and the instruments then calibrated to the dials. After such calibrations of the instruments, the dial of one instrument may be interchanged with that of another and each will still give correct indications of speed without requiring re-calibration.

One of the objects of the invention, therefore, is to provide a speed indicating instrument or tachometer embodying novel means for adjusting the operating characteristics thereof, so that the instrument may be employed with previously marked dials having equally or substantially equally spaced indicating marks thereon.

Another object is to provide in a speed indicating device embodying a centrifugally actuated mechanism, novel means for adjusting the range and the scale characteristics of the instrument, whereby interchangeable dials having similar scales thereon, may be employed.

Another object is to provide in a speed indicating device embodying a centrifugal governor, a pointer and motion transmitting mechanism for actuating the pointer from the governor, novel means for adjusting the mechanism, whereby substantially unequal increments of linear motion of the governor sleeve for equal increments of speed may be translated into substantially equal increments of angular motion of the pointer.

A further object is to provide in a speed indicating device embodying a centrifugally actuated mechanism, novel means for calibrating the mechanism to adjust the range and the scale characteristics thereof, whereby any one of several dials having identical scales with substantially uniformly spaced marks thereon, may be employed with any one of several devices of the same type in which the range and the scale characteristics vary within reasonable limits.

A still further object is to provide an improved construction, arrangement and operation of the mechanism of a centrifugal tachometer, whereby an instrument may be produced which is extremely light, accurate and inexpensive to manufacture, and for which the dials may be manufactured independently of the instrument and provided with suitably marked scales thereon having substantially uniformly spaced indicating marks within a selected range to which the instrument is adapted.

The above and other objects and advantages of the invention will appear more fully hereinafter from a consideration of the detailed description which follows, when read in connection with the accompanying drawings, wherein one embodiment of the invention is illustrated. It is to be expressly understood, however, that the drawings are for the purpose of illustration and description only, and are not designed as a definition of the limits of the invention, reference being had for this purpose to the appended claims.

In the drawings, wherein like reference characters refer to like parts throughout the several views, Fig. 1 is a front elevation, with parts broken away, of one form of speed indicating device embodying the present invention;

Fig. 2 is a vertical section taken on line 2—2 of Fig. 1;

Fig. 2a is a detail section of the bearing taken on line 2a—2a of Fig. 2;

Figs. 6, 7 and 8 are graphical representations illustrating the actual and the desired positions of the lever and pin for each step of the method of calibration of an instrument embodying the present invention.

Figure 3:
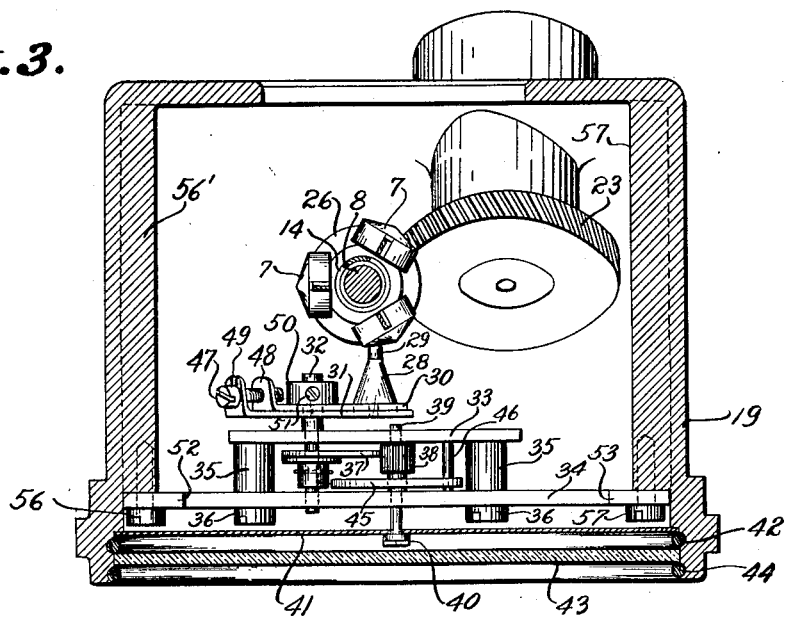
Fig. 3 is a sectional view taken on line 3—3 of Fig. 1.

The instrument embodying the invention is of the type wherein a centrifugally actuated member is operated by the machine, engine or motor, whose speed is to be indicated and the actuation of the centrifugal member is employed to operate a pointer through suitable motion transmitting means. In the form shown, the centrifugally actuated member is constituted by a plurality of weights 7, arranged circumferentially about a shaft or spindle 8, and each of which is pivotally mounted on arms 9 and 10. Arms 9 are, in turn, pivotally secured to a collar 11 which is fixed to, and rotatable with, the shaft 8 by means of a pin 12 passing through the shaft and pressed in the collar, i. e., the collar 11 is permanently secured to the shaft 8. The arms 10 are also pivotally secured to another collar 13 which, however, is not secured to the shaft, but rotatable with and movable longitudinally along the length thereof by the action of the weights 7 which are caused to fly out by centrifugal force when the shaft 8 is rotated. A coil spring 14 which surrounds the shaft 8 is interposed between the collars 11 and 13 so that the collar 13 is moved against the compression of the spring 14 when the weights 7 are caused to fly out and by means of which the collar 13 is returned to normal position when the rotation of the shaft ceases. By providing coil springs having different compression values per unit force applied, the instrument may be employed for different speed ranges, as is well known in the art. In practice, this is accomplished by changing either the size of wire or total length of the spring in the proper manner to produce either a stiffer or weaker spring, as the conditions may require.

The shaft 8 is journaled in suitable bearings 15 and 16 set in inwardly projecting portions or strips 17 and 18 formed integral with the casing 19, preferably by molding or casting, when the casing is formed. The bearing 15 is made adjustable so that any longitudinal play of the shaft 8 may be taken up. This may be accomplished by making the bearing race 20 itself a threaded member, as indicated in Fig. 2a which screws into the casing 19 so that it may move in or out, thereby taking up on the bearing. After the adjustment is made, the bearing race is held locked by means of a lock nut 21.

Means are provided for rotating the shaft 8 at cam shaft speed, or a multiple thereof, of the engine or motor whose speed is to be indicated and, in the embodiment illustrated, comprise a pinion 22 which meshes with a gear 23 drivably connected, in any suitable manner, to a flexible shaft (not shown) which is adapted to extend into the casing through a tubular portion 24 formed with the casing.

Means are now provided for employing the longitudinal motion of the collar 13 along the shaft 8 to actuate a pointer over a previously suitably marked dial or scale. In the form shown, said means comprise a transmission mechanism which includes a sleeve member 25 having an annular groove formed by circumferential flanges 26 and 27, said sleeve member being secured to, or formed integral with, the collar 13 so that said sleeve is movable along the shaft 8 with the collar 13 when the latter is actuated. A member 28 having a pin 29 which extends between and in operation engages the lower of two flanges 26 and 27, is mounted upon a lever 30 which, in turn, is carried on an adjustable lever 31, the first lever being secured to a stub shaft 32 journaled in a cross-bar 33. The latter is held in position on, and suspended by, a plate 34 to which it is fastened by means of spacing members 35 and screws 36 (Fig. 3). The shaft 32 is extended so that its opposite end is journaled in the plate 34 and has mounted thereon, or formed integral therewith, a gear sector 37 arranged to mesh with a pinion 38 carried by a counter-shaft 39 which is also journaled in the cross-bar 33 and plate 34. The counter-shaft 39 has secured thereto, at one end, a pointer or indicating hand 40 arranged to traverse a suitably marked scale or dial 41, the latter being held in place in the front of the casing 19 in any suitable manner as, for example, by means of screws 41a. A cover 43 of some suitable transparent material as, for example, glass or celluloid, is placed over the dial and secured in the front of the instrument casing by means of a clamping ring 44 which holds the cover glass against a rubber gasket 42.

It will be apparent from this arrangement that, as the sleeve member 25 is moved along the shaft 8 against the compression of the spring 14 by the action of the centrifugal weights 7, the flange 27 will move upwardly until it bears against the pin 29 (Figs. 2 and 5), thereby causing the pin to oscillate about the shaft 32 as a pivot and, by means of the connection between the levers 30 and 31, cause the shaft 32 to rotate. Rotation of the shaft 32 imparts rotation to the gear sector 37 which meshes with the pinion 38 thereby causing the latter to actuate the pointer or indicating hand 40 over the dial 41. A hairspring 45, having its external end secured to a pin 46 carried by the cross-bar 33, and its other end fixed to the pointer shaft 39, is provided for returning the pointer 40 to its starting point on the dial 41. It is to be noted, however, that this point need not necessarily represent zero revolutions per minute as a stop is provided in sector 37, as indicated at 37a in Fig. 4, which arrests the amplification mechanism after the pointer has reached the lowest reading provided for on the dial 41. This hairspring also serves to eliminate the backlash from the amplification mechanism and also to hold the pin 29 in contact with the collar 27 during operation.

Figure 4:
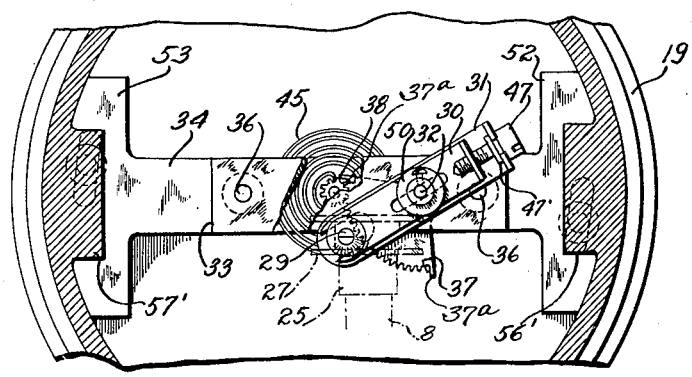
Fig. 4 is a partial sectional view along line 4—4 of Fig. 2.
Figure 5:
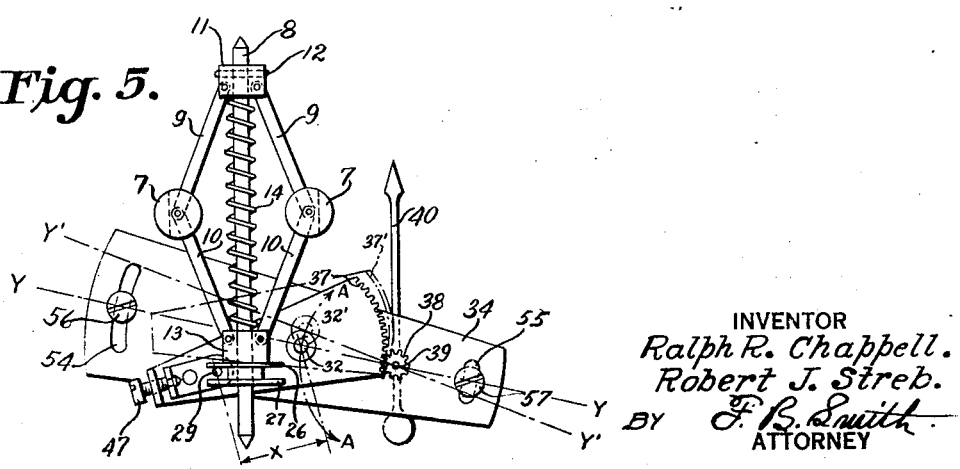
Fig. 5 is a diagrammatic view illustrating, in one plane, the novel means for adjusting the range and the scale characteristics of the mechanism to calibrate the instrument.

It is desirable to provide for the calibration of the instrument quickly and accurately so that its range and its scale characteristics may be changed in such a manner that the instrument may be employed with a dial having equally or substantially equally spaced speed indicating marks previously marked thereon and, to this end, means are provided for varying the lever arm between the pin and the shaft 32 to adjust the range of the instrument, and other means are also provided for changing the starting position of the pin 29 thereby adjusting the scale characteristics of the instrument so that unequal increments of linear travel of the governor sleeve for equal increments of engine speed are caused to produce equal increments of angular travel of the pointer. Referring more particularly to Figs. 3 and 4, the first-mentioned means include the calibrating levers 30 and 31, one of which is arranged to move relative to the other by means of a screw 47 threaded into an angularly bent portion 48 of the member 30 and extending through, and engaging, a similarly angularly bent portion 49 of the member 31 by means of an annular groove 47' provided in the head of the screw 47. The member 31 being rigidly secured to the shaft 32 by means of a sleeve 50 and set screw 51, rotation of the screw 47 causes the lever member 30 to move relative to the lever member 31 carrying with it the member 28 and the pin 29. Thus, the distance between the shaft 32 and the pin 29 may be varied so that a greater or lesser angular distance may be traversed by the gear sector for the same travel of the pin 29. Referring particularly to the diagrammatic illustration in Fig. 5, the distance between the shaft of the gear sector and the pin 29 is indicated at $x$, and from this figure it is more clearly apparent how adjustment of the screw 47 causes the pin 29 to move toward or away from the shaft 32 since, in this figure, the pin 29, the sector 37 and pinion 38 are shown in the same plane on opposite sides of the shaft 32 so that the interconnection of the elements of the transmission mechanism may be more clearly perceived than in the actual mechanical embodiment shown in Figs. 1 to 4, inclusive, wherein the pin 29 and the pinion 38 are on the same side of the shaft 32. In this manner, the total angular travel of the pointer for a given range of travel of the pin 29 is varied so that the pointer substantially coincides with the indicating marks of the scale at the lowest and highest speeds, and the range of the instrument adjusted to a first approximation.

In order to accommodate the rotation of the pointer over a previously marked and equally divided scale to the unequal linear travel of the sleeve 25, so that the pointer may be made to substantially coincide with the intermediate indicating marks between the lowest and highest speeds on the scale, the second-mentioned adjusting means are employed for adjusting the "starting angle" of the gear sector 37 and, hence, angularly shifting the starting position of the pin 29, and for this purpose the supporting plate 34 is arranged to be shifted angularly about the axis of the pointer shaft 39, thereby carrying with it the lever shaft 32, since the latter is journaled in said plate. The "starting angle" of the gear sector, as used herein, is the angle existing between the line of action of the lever 30—31 and the plane of the face of the collar 27 at the moment that the pin 29 is in contact with the governor collar 27 and when the latter is about to lift said pin. This angle has been indicated as angle $a$ in Fig. 6, and is the angle whose sine is $\frac{z}{x}$.

It has been called the "starting angle" since it is the angle which exists at the instant the device starts to indicate by the action of the collar 27 against the pin 29, i. e., at the instant that the collar 27 engages the pin 29. In order to permit the angular shifting of the plate 34, the latter is formed with cross-pieces 52 and 53 at its opposite ends, said cross-pieces being slotted as indicated at 54 and 55 so that the plate may be shifted relative to the screws 56 and 57 which fasten the plate to inwardly projecting bosses 56' and 57' formed integrally with the casing. By shifting the plate 34 about the pointer shaft 39, the shaft 32 of the gear sector and also the latter are shifted through an arc, the center of which coincides with the axis of the pointer shaft 39. In this manner the starting angle of the gear sector and, hence, the starting position of the pin 29 is angularly shifted about the shaft 39, thus changing the scale characteristics of the mechanism so that for a certain position of the pointer 40 and the dial 41 the indicated speed may be somewhat greater or less within manufacturing tolerances, that is, in one position of the plate 34 a certain position of the pointer may correspond to one speed while in another position of the plate 34 the same position of the pointer on the scale may correspond to a slightly higher or lower speed, depending upon which way the plate 34 is shifted. Referring again to Fig. 5, the center line Y—Y of the plate 34 is shown shifted to the position Y'—Y' in which the shaft 32 has been shifted to the position 32' along the arc A—A about the axis of shaft 39. In shifting the gear sector shaft 32 to the position 32', the gear sector 37 is carried with it and then falls in the position 37'. By angularly shifting the position of the shaft 32, the starting position, which is at 500 R. P. M., of pin 29 with respect to the zero position of the governor table or flange 27 may be slightly raised or lowered and, therefore, it may be necessary to restore the pin 29 to its original starting position with respect to the flange by adjusting the length of lever 30—31. This, however, will not move the governor table because there is no force produced on the flange by the pin and the effect will rather be on the pointer. In this manner, the scale characteristics of the instrument may be quickly and easily changed and, therefore, by the two adjustments, namely, the lever arm adjustment and the starting angle adjustment, the instrument may be employed with dials having equally spaced speed indicating marks thereon within a range to which the instrument is adapted, and the pointer may be made to substantially coincide with said speed indicating marks at the indicated speeds.

In Figs. 6a, 7a and 8a there are illustrated, diagrammatically, various actual conditions before, during and after the process of calibration of the instrument, and in Figs. 6b, 7b and 8b are shown comparison diagrams illustrating the necessary equal increments of angular travel required of lever 30—31 to match an equally divided scale, i. e., all angular increments are equal and the dots indicate the desired positions of the pin 29. Referring now to Fig. 6a there is shown diagrammatically an actual scale drawing of the positions of the governor collar 27 at certain definite speeds of rotation as, for example, from 500 R. P. M. to 3000 R. P. M. Superimposed on this is a scale drawing of the actual angular displacement of the lever member 30—31 and pin 29 for the same speeds of rotation. It will be noted that a governor of the type described moves the collar 27 in such a manner as to give much more constricted increments of travel for equal increments of speed at the higher speeds than in the lower speeds. This follows from the increasing mechanical advance of the governor spring against the pull of the weights 7 for more open positions of the toggle linkage 9—10 employed. The angular increments in the positions of the lever 30—31 must, however, be made all equal in order that the pointer which is geared to the lever by spur gearing, may operate on an equally or substantially equally divided circular scale.

Fig. 6a represents the conditions in an instrument just after assembly. In this condition the instrument is not calibrated and the pointer does not agree with the previously etched or engraved and equally spaced marks on the scale and the lever 30—31 does not cover the entire range of speeds when the tachometer is driven by an engine shaft rotating at the scale speeds.

Considering now the first effect of altering the distance $x$ between pin 29 and shaft 32 in a range from 500 to 3000 R. P. M., such increase of the distance $x$ to $x'$ causes the total range of the lever member 30—31 to increase and produces the conditions shown in Fig. 7a. It will be noted from the latter figure, as compared to Fig. 6a, that the pin 29 now covers the entire range but the angular increments are unequal and more so in the upper speeds. Therefore, in order to make the angular increments equal throughout the entire range, the supporting plate 34 is shifted angularly about the axis of the pointer shaft 39, thereby carrying with it the lever shaft 32 and pin 29. This has the effect of shifting the lever and pin, as represented by sector-like pattern shown in Fig. 7b, so that the angular increments are equal and still the positions of pin 29 coincide with the positions of the collar 27, as indicated in Figs. 8a and 8b. This then is the desired condition under which the pointer will coincide with the equally spaced marks on the scale of the dial, since all angular increments of the lever 30—31 are now found to be equal. Both figures 8a and 8b are identical since the actual travel now is exactly the same as that desired.

Although specific figures of from 500 R. P. M. to 3000 R. P. M. have been employed for the sake of clarity in describing the function of the adjustments, it is not intended to thereby limit, in any way, the application of the method of calibration since it may be applied to any centrifugal tachometer.

The method of calibrating the instrument to a dial having equally spaced marks thereon, and employing the adjustments described above, may be summed up as follows:

1. The pointer 40 is set at the initial position on the dial and the calibration lever 30—31 is then rotated on the shaft 32, by loosening set screw 51, until the pin 29 is in such a position that the pointer 40 immediately begins to rotate as the speed is increased above the initial speed indicated on the dial. After the starting point is thus determined, the screw 51 is tightened and the speed is increased by equal increments until the full range of the instrument is reached. This serves to show the initial range and the scale characteristics of the instrument.

2. Calibration is accomplished by interpreting the results of this trial run. If the pointer falls short of making its proper excursion throughout the entire range, as shown in Fig. 6a, it is evident that the screw 47 must be turned in such a manner as to increase the length of the lever 30—31, that is, the increase of the distance $x$ to $x'$ should thus increase the sweep of said lever, as shown in Fig. 7a. Should the pointer make too great an excursion throughout the range, that is, if it goes beyond 3000 R. P. M., the opposite procedure is resorted to.

3. After the instrument is adjusted for range, as described above and indicated in Fig. 7a, it must be adjusted so that the unequal linear increments of governor sleeve travel will cause equal angular increments of the pointer for equal increments of speed for intermediate points, by shifting the plate 34. If the instrument operates so that the pointer moves too far with a given rise of the sleeve 25 the plate 34 must be shifted by rotating it in such a direction as to raise the shaft 32 and pin 29 into a higher position with relation to the zero position of the flange 27. This adjustment is shown in Fig. 8a. The opposite procedure would be followed in case the instrument were found to operate too slowly.

4. If the next succeeding test made on the instrument shows that it is fast or slow, an adjustment of the screw 47 may be necessary.

Both adjustments are, therefore, interdependent and it requires the manipulation of both the screw 47 and the plate 34 to calibrate the instrument. It should be borne in mind, during the process, that it is the screw 47 changing the length of the pin lever 30—31 that is controlling the sweep of the arc of travel of pin 29 and hence the range of the instrument and the shifting of the plate 34 that is controlling the accommodation of the unequal travel of the sleeve 25 to the equal angular increments of travel of the pointer 40 over the dial so that said pointer will substantially coincide with the equally spaced marks on the dial at the indicated speeds.

From the foregoing it will be seen that there is provided a novel speed indicating instrument which may be employed with dials having equally or substantially equally divided scales, and novel means are also provided for adjusting the operating characteristics of the centrifugally actuated mechanism so that the instrument may be easily calibrated to any dial having the proper increments on the scale, or re-calibrated with the same dial in the event the adjustments are changed due to violent shocks imparted to the instrument, which may occur either by dropping the instrument or by severe impact of the vehicle or engine with which the instrument is associated.

While only one embodiment of the invention has been illustrated and described, various changes and modifications which will now appear to those skilled in the art may be made in the construction and relative arrangement of parts, without departing from the scope of the invention. Reference is, therefore, to be had to the appended claims for a definition of the limits of the invention.

What is claimed is:

1. In a centrifugal tachometer, a dial having substantially equally spaced indicating marks thereon within a selected range of speeds to which the tachometer is adapted, a pointer cooperating with the dial, a governor having one end secured to a rotatable shaft and having a sleeve on the other end adapted to move along said shaft in unequal increments for equal increments of speed, transmission means for actuating the pointer upon longitudinal movement of the governor sleeve and including a gear sector and a lever arm movable as a unit, said lever arm having a pin engaged by the sleeve of the governor during operation for actuation thereby, and means for longitudinally and angularly shifting the position of the pin along the lever arm and about the axis of the pointer, respectively, so that the pointer may be adjusted to completely traverse the dial for the selected range and so that the unequal linear increments of travel of the governor sleeve are caused to produce equal increments of travel of the pointer over the dial whereby said pointer is made to substantially coincide with the equally spaced marks on the dial at the indicated speeds.

2. In a speed indicating device, the combination of a rotatable shaft adapted to be driven by the engine or motor whose speed is to be indicated, a centrifugal governor having one end permanently secured to said shaft and having its other end movable along said shaft in substantially unequal increments for equal increments of speed of said shaft, a dial having substantially equally spaced speed indicating marks thereon within a selected range for which the device is adapted, a pointer arranged to traverse said dial, transmission mechanism for moving said pointer by the movable end of the governor, means for adjusting the transmission mechanism so that the pointer will traverse the selected range and substantially coincide with the lowest and highest marks on the dial, and second means for adjusting the transmission mechanism so that the pointer is made to substantially coincide with the speed indicating marks intermediate the lowest and highest marks on the dial at the indicated speeds within the selected range.

3. In a speed indicating device, a casing enclosing a dial having equally spaced speed indicating marks thereon within a selected range to which the device is adapted, a pointer cooperating with said dial, an adjustable lever, inter-geared pointer and lever shafts, a centrifugal governor having a permanently fixed end and a movable end adapted to move lineally in substantially unequal increments for equal increments of speed, a pin carried by the adjustable lever and engaged by the movable end of the governor during operation for actuation thereby, means for adjusting the distance between the pin and the lever shaft for adjusting the range of the instrument to make the pointer substantially coincide with the lowest and highest speed marks on the dial, and means for angularly shifting the position of the lever shaft and pin about the pointer shaft to make the pointer substantially coincide with the speed indicating marks between the lowest and highest indicated speeds.

4. In a speed indicating device, the combination of a rotatable shaft adapted to be driven by the engine or motor whose speed is to be indicated, a centrifugal governor having one end permanently secured to said shaft and having its other end movable longitudinally along said shaft, a dial having a scale comprising uniformly spaced speed indicating marks thereon within a selected range to which the device is adapted, a pointer arranged to traverse said dial, an adjustable lever, inter-geared pointer and lever shafts, a pin carried by the adjustable lever and engaged by the movable end of the governor for movement therewith when the lowest speed of the selected range is reached, means for adjusting the distance of the pin to the lever shaft for adjusting the range of the instrument so that the pointer is made to substantially coincide with the lowest speed indicating mark on the dial at the instant that the pin is engaged by the movable end of the governor and with the highest speed indicating mark on the dial at the indicated speed, and means for angularly adjusting the position of the pin and of the lever shaft through an arc the center of which coincides with the axis of the pointer shaft so that the pointer is made to substantially coincide with the speed indicating marks between the lowest and highest marks on the dial at the indicated speeds.

5. In a speed indicating device, the combination of a rotatable shaft adapted to be driven by the engine or motor whose speed is to be indicated, a centrifugal governor having one end permanently secured to said shaft and having its other end movable longitudinally along said shaft, a dial having a scale comprising uniformly spaced speed indicating marks thereon within a selected range to which the device is adapted, a pointer arranged to traverse said dial, an adjustable lever, inter-geared pointer and lever shafts, a pin carried by the adjustable lever and engaged by the movable end of the governor for movement therewith when the lowest speed of the selected range is reached, means for adjusting the distance of the pin to the lever shaft for adjusting the range of the instrument so that the pointer is made to substantially coincide with the lowest speed indicating mark on the dial at the instant that the pin is engaged by the movable end of the governor and with the highest speed indicating mark on the dial when the indicated speed is reached, and means for angularly adjusting the position of the pin and of the lever shaft with respect to the movable end of the governor through an arc the center of which coincides with the axis of the pointer shaft so that the pointer is made to substantially coincide with the speed indicating marks between the lowest and highest marks on the dial at the indicated speeds, said last-mentioned means comprising a plate angularly adjustable about the pointer shaft from the front of the instrument and carrying the transmission mechanism including the pin, the lever and the inter-geared pointer and lever shafts.

6. In a centrifugal tachometer, a casing enclosing a dial having substantially uniformly spaced speed-indicating marks thereon, a rotatable shaft driven by the mechanism the speed of which is to be indicated, a governor having one end permanently fixed on said shaft and its other end longitudinally movable along said shaft, a pointer, a calibrating lever comprising relatively fixed and adjustable members, inter-geared pointer and lever shafts, a pin carried by said calibrating lever and engaged and moved by the movable end of said governor during operation, and means for adjusting the positions of both the pin and the lever shaft whereby the pointer is made to traverse the entire range of the dial and to substantially coincide with the said indicating marks at the indicated speeds.

7. In a speed-indicating device, a dial having substantially equally spaced speed-indicating marks thereon within a selected range, a pointer cooperating with the dial, a centrifugal governor having one end secured to a rotatable shaft and having its other end movable longitudinally along said shaft in unequal increments for equal increments of speed, transmission means for actuating the pointer upon longitudinal movement of the movable end of said governor and including a gear sector drivably connected to the pointer and a support associated with said gear sector and movable as a unit therewith, a pin adjustably carried by said support, means engaging said pin for actuating the latter upon operation of the governor for angularly actuating the gear sector, means for shifting the position of said pin on its support along a straight line, and means for angularly adjusting the engaging position between the pin and its actuating means.

RALPH R. CHAPPELL.
ROBERT J. STREB.